US010690179B2

(12) United States Patent
Gharib et al.

(10) Patent No.: US 10,690,179 B2
(45) Date of Patent: Jun. 23, 2020

(54) THRUST BEARING ALIGNMENT

(71) Applicant: Halliburton Energy Services, Inc., Houston, TX (US)

(72) Inventors: Hossam Mohamed Gharib, Edmonton (CA); Steven Graham Bell, Red Deer (CA); Steven Park, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 236 days.

(21) Appl. No.: 15/566,288

(22) PCT Filed: May 26, 2015

(86) PCT No.: PCT/US2015/032359
§ 371 (c)(1),
(2) Date: Oct. 13, 2017

(87) PCT Pub. No.: WO2016/190848
PCT Pub. Date: Dec. 1, 2016

(65) Prior Publication Data
US 2018/0119733 A1 May 3, 2018

(51) Int. Cl.
*E21B 4/00* (2006.01)
*F16C 17/04* (2006.01)
(Continued)

(52) U.S. Cl.
CPC .............. *F16C 17/04* (2013.01); *E21B 4/003* (2013.01); *E21B 17/02* (2013.01); *F16C 23/048* (2013.01);
(Continued)

(58) Field of Classification Search
CPC .. E21B 4/003; E16C 2352/00; F16C 2352/00; F16C 17/04; F16C 23/04
See application file for complete search history.

(56) References Cited

U.S. PATENT DOCUMENTS 3,840,080 A   10/1974   Berryman et al.
4,240,683 A * 12/1980   Crase ..................... E21B 4/003
                                                        175/320

(Continued)

FOREIGN PATENT DOCUMENTS

CA        2665013      10/2009
WO      2010104915      9/2010

OTHER PUBLICATIONS

International Patent Application No. PCT/US2015/032359, "International Search Report and Written Opinion", dated Jan. 19, 2016, 12 pages.

*Primary Examiner* — Robert E Fuller
(74) *Attorney, Agent, or Firm* — Kilpatrick Townsend & Stockton LLP

(57) ABSTRACT

An assembly for use in a wellbore can include a drill string having an outer housing and a thrust bearing sleeve positioned within the outer housing of the drill string. The assembly can also include a stationary thrust bearing positioned within the thrust bearing sleeve and coaxially around a mandrel extending through a longitudinal length of the thrust bearing sleeve. The assembly can further include an interlocking component including a first end coupled to the stationary thrust bearing and a second end positioned in a recessed portion of a housing of the drill string for preventing the stationary thrust bearing from rotating about a central axis of the mandrel, and for allowing the stationary thrust bearing to rotate about one or more axes perpendicular to the central axis. The assembly can include a flexible member for opposing a rotational force applied to the stationary thrust bearing by another thrust bearing.

20 Claims, 11 Drawing Sheets

(51) Int. Cl.
*F16C 23/04* (2006.01)
*F16C 35/02* (2006.01)
*E21B 17/02* (2006.01)
*F16C 33/26* (2006.01)

(52) U.S. Cl.
CPC .............. *F16C 35/02* (2013.01); *F16C 33/26* (2013.01); *F16C 2226/50* (2013.01); *F16C 2352/00* (2013.01)

(56) References Cited

U.S. PATENT DOCUMENTS

| | | | |
|---|---|---|---|
| 4,501,454 A | 2/1985 | Dennis et al. | |
| 4,560,014 A * | 12/1985 | Geczy | E21B 4/003 175/107 |
| 5,037,212 A * | 8/1991 | Justman | E21B 4/003 175/107 |
| 5,253,939 A | 10/1993 | Hall | |
| 5,368,398 A | 11/1994 | Damm et al. | |
| 5,765,950 A | 6/1998 | Eno et al. | |
| 6,561,290 B2 | 5/2003 | Blair et al. | |
| 7,500,787 B2 | 3/2009 | Cioceanu et al. | |
| 7,549,487 B2 | 6/2009 | LeBlanc et al. | |
| 7,552,782 B1 * | 6/2009 | Sexton | E21B 4/003 175/107 |
| 7,845,855 B2 | 12/2010 | Bischof et al. | |
| 7,870,913 B1 * | 1/2011 | Sexton | F16O 33/043 175/104 |
| 8,376,616 B2 | 2/2013 | Pheasey et al. | |
| 8,511,906 B2 | 8/2013 | Marchand et al. | |
| 8,616,304 B2 | 12/2013 | Scott et al. | |
| 8,651,743 B2 | 2/2014 | Sexton et al. | |
| 8,701,797 B2 | 4/2014 | Baudoin et al. | |
| 8,721,182 B2 | 5/2014 | Cioceanu et al. | |
| 8,800,686 B2 | 8/2014 | Cooley et al. | |
| 8,961,019 B2 * | 2/2015 | Konde | F16C 17/04 384/368 |
| 10,000,972 B2 * | 6/2018 | Gaikwad | E21B 7/067 |
| 2006/0063442 A1 * | 3/2006 | Taylor | B63H 5/14 440/78 |
| 2006/0278439 A1 * | 12/2006 | Ide | E21B 4/003 175/107 |
| 2009/0272581 A1 * | 11/2009 | Beylotte | E21B 4/02 175/107 |
| 2010/0135606 A1 | 6/2010 | Ehlert et al. | |
| 2012/0043133 A1 * | 2/2012 | Millet | E21B 7/067 175/55 |
| 2013/0341099 A1 | 12/2013 | Gillis et al. | |
| 2014/0102810 A1 | 4/2014 | Peterson et al. | |
| 2014/0254967 A1 | 9/2014 | Gonzalez et al. | |
| 2015/0027688 A1 | 1/2015 | Sokol et al. | |
| 2018/0073299 A1 * | 3/2018 | Gharib | E21B 4/003 |

* cited by examiner

THRUST BEARING ALIGNMENT

CROSS-REFERENCE TO RELATED APPLICATIONS

This is a U.S. national phase under 35 U.S.C. 371 of International Patent Application No. PCT/US2015/032359 titled "Thrust Bearing Alignment" and filed May 26, 2015, the entirety of which is incorporated herein by reference.

TECHNICAL FIELD

The present disclosure relates generally to devices for use in well systems. More specifically, but not by way of limitation, this disclosure relates to aligning thrust bearings downhole.

BACKGROUND

A well system (e.g., an oil or gas well for extracting fluid or gas from a subterranean formation) can include a drill string for drilling a wellbore. The drill string can include a bottom hole assembly with a drill bit. The weight of the drill string can exert a downward force on the drill bit. In some cases, the downward force can exceed 100,000 pounds of force (lbf). If the downward force is not adequately transferred through the drill string to the drill bit, components internal to the drill string can fracture or deform.

DETAILED DESCRIPTION

Figure 1:
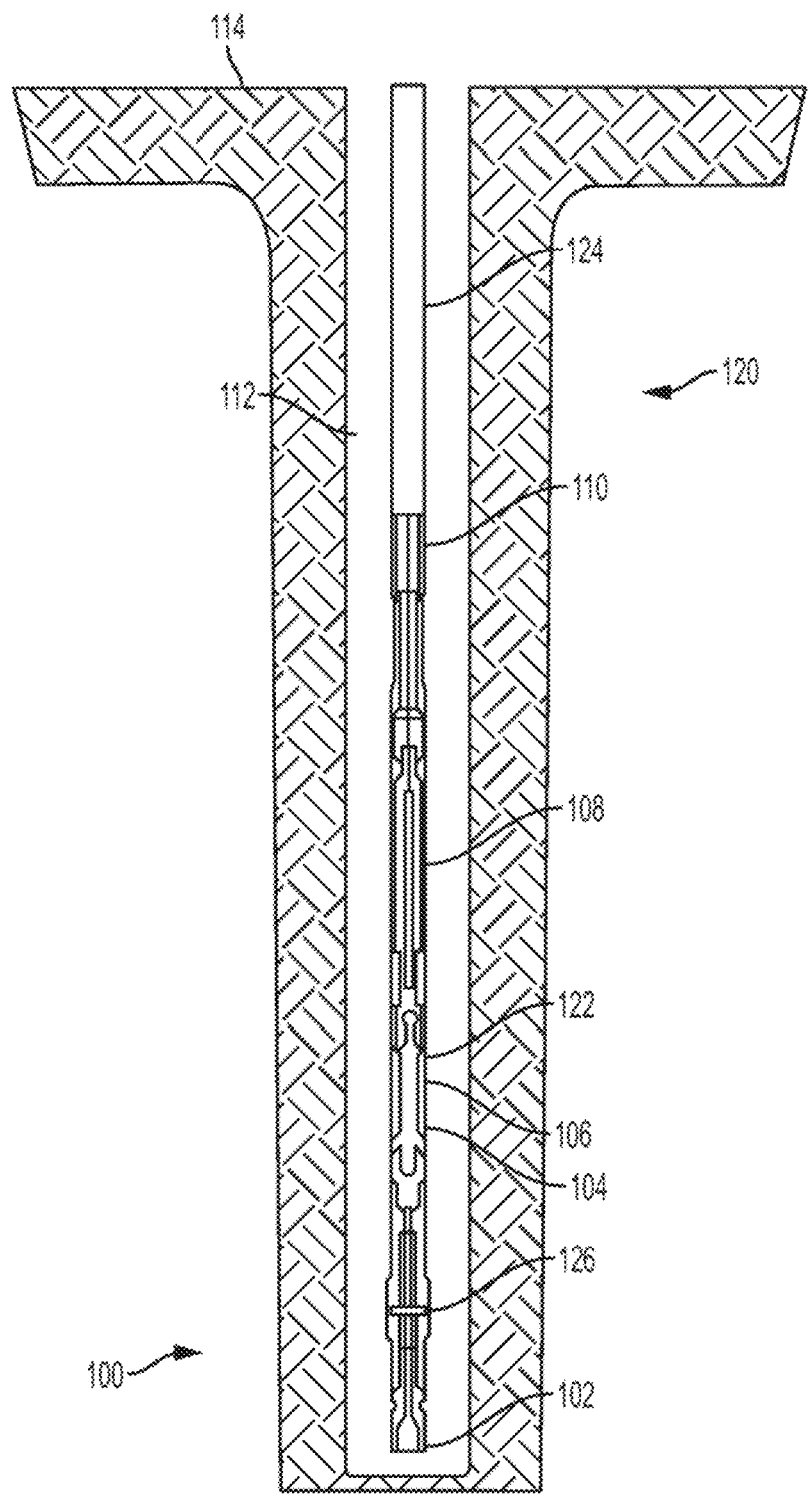
FIG. 1 is a cross-sectional view of an example of a well system that includes an assembly for aligning thrust bearings downhole according to some aspects.

Certain aspects and features of the present disclosure relate to aligning thrust bearings (e.g., a stationary thrust bearing and a rotating thrust bearing) in a bottom hole assembly. The bottom hole assembly can include a stationary thrust bearing and a rotating thrust bearing both positioned coaxially around a mandrel extending through a longitudinal length of the bottom hole assembly. A surface of the stationary thrust bearing can be positioned adjacent to a surface of a rotating thrust bearing. The surface of the stationary thrust bearing can contact the surface of the rotating thrust bearing. The mandrel (and the rotating thrust bearing affixed to the mandrel) can rotate about a central, longitudinal axis. In some examples, the stationary thrust bearing can include an interlocking component extending outward from a circumference of the stationary thrust bearing. A distal end of the interlocking component can include a rounded surface and can be positioned in a recessed portion of a housing of the bottom hole assembly (e.g., a thrust bearing sleeve of the bottom hole assembly). Positioning the interlocking component in the recessed portion of the housing can prevent the stationary thrust bearing from rotating about the central axis. The rounded surface of the interlocking component can allow the stationary thrust bearing to rotate in the two degrees of freedom perpendicular to the central axis. This can allow the stationary thrust bearing to reorient in response to forces applied by the rotating thrust bearing in the two degrees of freedom, which can keep the surface of the stationary thrust bearing substantially aligned with (e.g., parallel to) the surface of the rotating thrust bearing.

In some examples, the bottom hole assembly can include a flexible member (e.g., a spring) positioned adjacent to the stationary thrust bearing. The flexible member can be coupled to a surface of the stationary thrust bearing that is opposite to the surface adjacent to the rotating thrust bearing. The flexible member can counteract rotational forces about the two degrees of freedom applied by the rotating thrust bearing. This can return the stationary thrust bearing to a default, unrotated position, or otherwise allow the stationary thrust bearing to remain substantially aligned with the rotating thrust bearing.

It can be desirable to keep the surfaces of thrust bearings substantially aligned. Thrust bearings can become misaligned due to downhole pressures or loads bending the mandrel. If the thrust bearings become misaligned, the thrust load carrying capacity of the thrust bearings can be significantly reduced. For example, misalignment of the thrust bearings by one degree can reduce the thrust load carrying capacity of the thrust bearings by more than 60%. Certain aspects and features of the present disclosure can reduce or eliminate such misalignment.

In some examples, the interlocking component can be removably coupled to the stationary thrust bearing. For example, the stationary thrust bearing can include a recessed portion into which one end of the interlocking component can be positioned and affixed. The opposite end of the interlocking component can be positioned in the recessed portion of the housing of the bottom hole assembly. In some examples, the interlocking component can include a spherical shape or ball shape. The recessed portion of the stationary thrust bearing can include rectangular or slotted shape into which one end of the interlocking component can be affixed.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 (e.g., an oil or gas well for extracting fluids from a subterranean formation) that includes an assembly 126 for aligning thrust bearings downhole according to some aspects. The well system 100 can include a wellbore 112 extending through various earth strata. The wellbore 112 extends through a hydrocarbon bearing subterranean formation 120. In some examples, the wellbore can include a casing string coupled to the walls of the wellbore 112 (e.g., via cement).

A drill string 124 can be located in the wellbore 112. The drill string 124 can extend from the well surface 114 to the interior of the wellbore 112. The drill string 124 can include a bottom hole assembly 104. The bottom hole assembly 104 can include an upper connection 110, a power section 108 (e.g., with a motor assembly 122), and a drill bit 102. An outer housing 106 can enclose the bottom hole assembly 104 and/or other components of the drill string 124.

In some examples, the bottom hole assembly 104 can include two or more thrust bearings. The thrust bearings can be for transferring forces (e.g., downward forces) or loads between the outer housing 106 of the bottom hole assembly 104 and the motor assembly 122. Misalignment of the thrust bearings can significantly reduce the thrust load carrying capacity of the thrust bearings. For example, a one degree misalignment between two of the thrust bearings can reduce the thrust load carrying capacity of the thrust bearings by 60% or more. The bottom hole assembly 104 can include an assembly 126 for keeping the thrust bearings substantially aligned.

Figure 2:
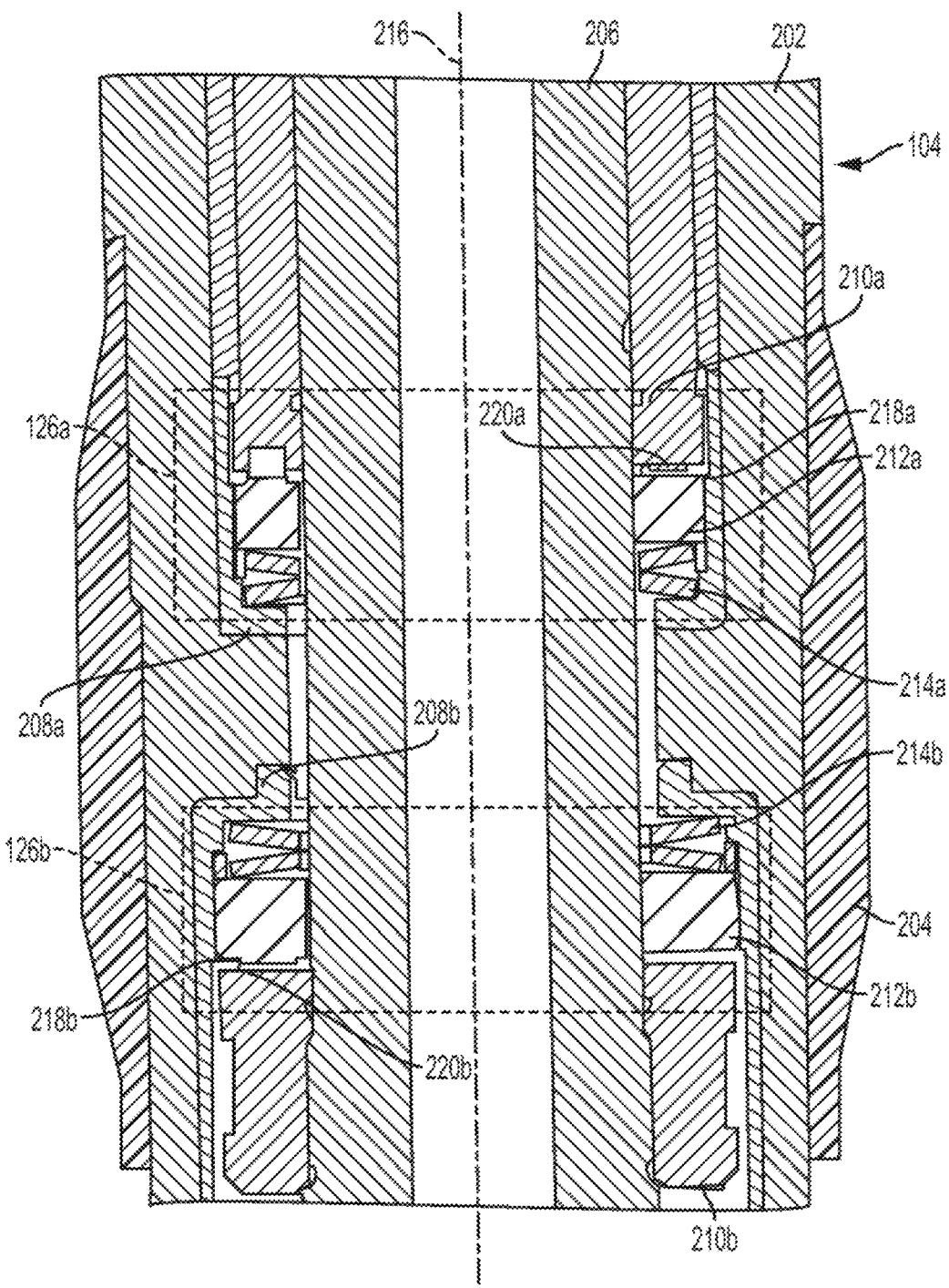
FIG. 2 is a cross-sectional side view of an example of a bottom hole assembly that includes assemblies for aligning thrust bearings downhole according to some aspects.

FIG. 2 is a cross-sectional side view of an example of a bottom hole assembly 104 that includes assemblies 126a-b for aligning thrust bearings 210a-b, 212a-b downhole according to some aspects. The bottom hole assembly 104 can include an outer housing 202. The outer housing 202 can protect the components of the bottom hole assembly 104 from damage (e.g., due to impact with other well tools or a harsh environment in the wellbore). In some examples, the bottom hole assembly 104 can include a stabilizer 204. The stabilizer 204 can be positioned coaxially around the outer housing 202. The stabilizer 204 can act as a buffer to prevent the bottom hole assembly 104 from impacting one or more side walls of the wellbore.

The bottom hole assembly 104 can include a mandrel 206. The mandrel 206 can extend through a longitudinal length of an interior of the outer housing 202. In some examples, the mandrel 206 can be a component of a motor assembly (e.g., a drive shaft of the motor assembly 122 of FIG. 1). The mandrel 206 can rotate about a central axis 216 of the mandrel 206.

The bottom hole assembly 104 can include a thrust bearing sleeve 208a-b. The thrust bearing sleeve 208a-b can include a sleeve (e.g., a tubular piece of metal or another material) or a housing for enclosing one or more thrust bearings 210a-b, 212a-b within the bottom hole assembly 104. The thrust bearing sleeve 208a-b can be positioned coaxially around the mandrel 206 and between the mandrel 206 and the outer housing 202. For example, an inner diameter of the thrust bearing sleeve 208a-b can be larger than an outer diameter of the mandrel 206 and smaller than an inner diameter of the outer housing 202.

The thrust bearing sleeve 208a-b can include a rotating thrust bearing 210a-b. The rotating thrust bearing 210a-b can include a substantially cylindrical shape. The rotating thrust bearing 210a-b can be positioned coaxially around the mandrel 206 and between the mandrel 206 and the thrust bearing sleeve 208a-b. For example, an inner diameter of the rotating thrust bearing 210a-b can be larger than the outer diameter of the mandrel 206 and smaller than an inner diameter of the thrust bearing sleeve 208a-b. The rotating thrust bearing 210a-b can be coupled to the mandrel 206 and rotatable with the mandrel 206. As the mandrel 206 rotates about the central axis 216, the rotating thrust bearing 210a-b can also rotate about the central axis 216. In some examples, the rotating thrust bearing 210a-b can include a ball bearing, a polycrystalline diamond compact (PDC) bearing, or another bearing.

The thrust bearing sleeve 208a-b can also include a stationary thrust bearing 212a-b. The stationary thrust bearing 212a-b can include a substantially cylindrical shape. The stationary thrust bearing 212a-b can be positioned coaxially around the mandrel 206 and between the mandrel 206 and the thrust bearing sleeve 208a-b. For example, an inner diameter of the stationary thrust bearing 212a-b can be larger than the outer diameter of the mandrel 206 and smaller than an inner diameter of the thrust bearing sleeve 208a-b. The stationary thrust bearing 212a-b can remain stationary with respect to the mandrel 206 and the outer housing 202 (e.g., if the mandrel 206 rotates about central axis 216). In some examples, the stationary thrust bearing 212a-b can include a ball bearing, a PDC bearing, or another bearing.

The stationary thrust bearing 212a-b can include an interface surface 218a-b. The interface surface 218a-b can be positioned adjacent to another interface surface 220a-b of the rotating thrust bearing 210a-b. The stationary thrust bearing 212a-b and rotating thrust bearing 210a-b can contact and transmit a load between each other via the interface surfaces 218a-b, 220a-b. If the interface surfaces 218a-b, 220a-b become misaligned, for example due to the mandrel 206 bending (due to downhole pressures or loads), the carrying capacity of the thrust bearings 210a-b, 212a-b can be significantly reduced. For example, misalignment of the interface surfaces 218a-b, 220a-b can reduce the thrust load carrying capacity of the thrust bearings 210a-b, 212a-b by more than 60%. It can be desirable to keep the interface surfaces 218a-b, 220a-b substantially aligned (e.g., parallel to one another).

The bottom hole assembly 104 can include an assembly 126a-b for keeping the interface surface 218a-b of the stationary thrust bearing 212a-b substantially aligned with the interface surface 220a-b of the rotating thrust bearing 210a-b. For example, the bottom hole assembly 104 can include an assembly 126a for keeping the interface surface 218a of the stationary thrust bearing 212a substantially aligned with the interface surface 220a of the rotating thrust bearing 210a. The bottom hole assembly 104 can additionally or alternatively include an assembly 126b for keeping the interface surface 218b of the stationary thrust bearing 212b substantially aligned with the interface surface 220b of the rotating thrust bearing 210b.

In some examples, the assembly 126a-b can include a flexible member 214a-b. The flexible member 214a-b can include, for example, an elastomer, a Bellville spring, a wave spring, a coil spring, or any combination of these. In some examples, the flexible member 214a-b can be positioned coaxially around the mandrel 206 and between the mandrel 206 and the thrust bearing sleeve 208a-b. For example, an inner diameter of the flexible member 214a-b can be larger than the outer diameter of the mandrel 206 and smaller than an inner diameter of the thrust bearing sleeve 208*a-b*. The flexible member 214*a-b* can be positioned adjacent to the stationary thrust bearing 212*a-b* on one side and adjacent to a wall of the thrust bearing sleeve 208*a-b* on another side. The flexible member 214*a-b* can apply forces to the stationary thrust bearing 212*a-b* to rotate the stationary thrust bearing 212*a-b* about one or more axes, as described in greater detail below. This rotation can help keep the interface surfaces 218*a-b*, 220*a-b* substantially aligned.

Figure 3:
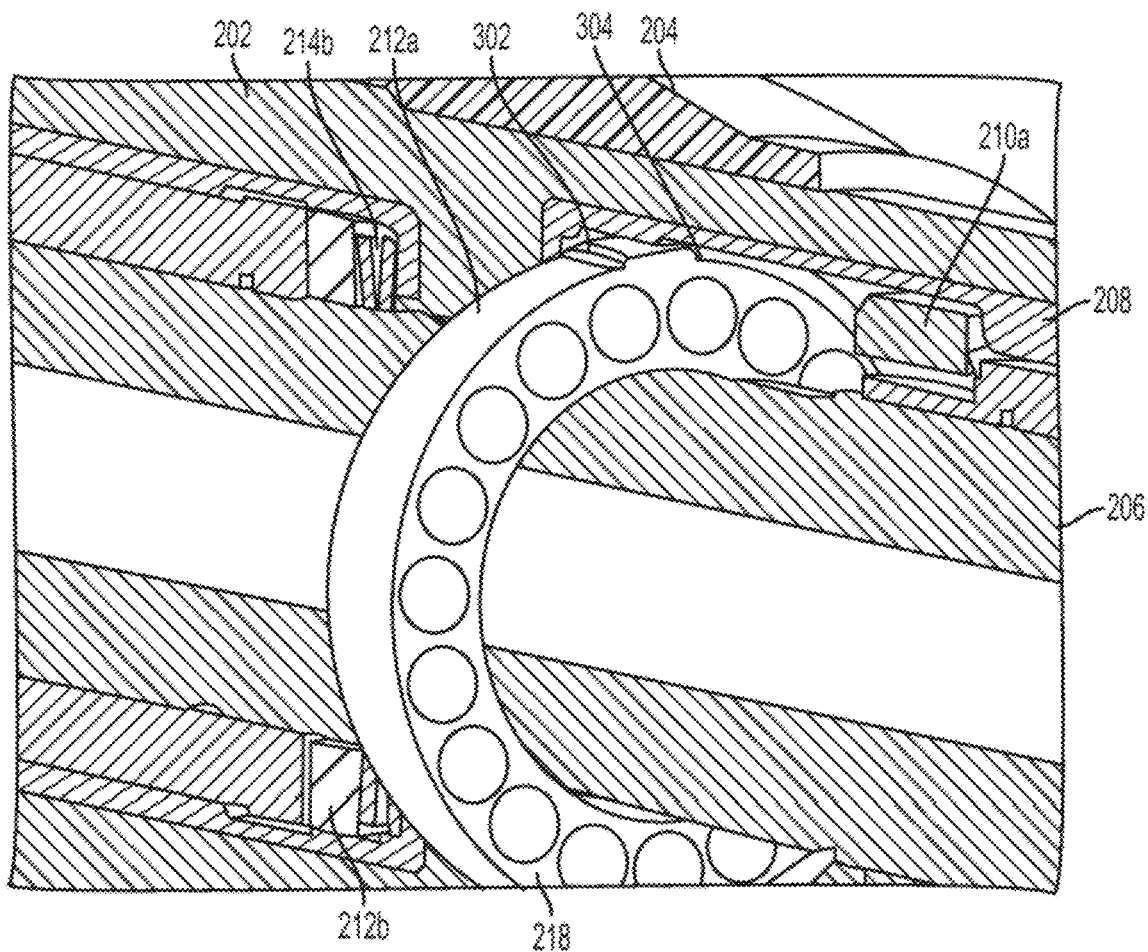
FIG. 3 is a cut-away isometric view of the example shown in FIG. 2 according to some aspects.

The assembly 126*a-b* can also include a recessed area 304 or cutout of the thrust bearing sleeve 208, as shown in FIG. 3. The recessed area 304 can be milled out of, or otherwise extracted from, the thrust bearing sleeve 208. The recessed area 304 can be sized for receiving an interlocking component 302 coupled to the stationary thrust bearing 212*a-b*. For example, the recessed area 304 can include a rectangular shape that is sized for receiving the interlocking component 302.

Figure 4:
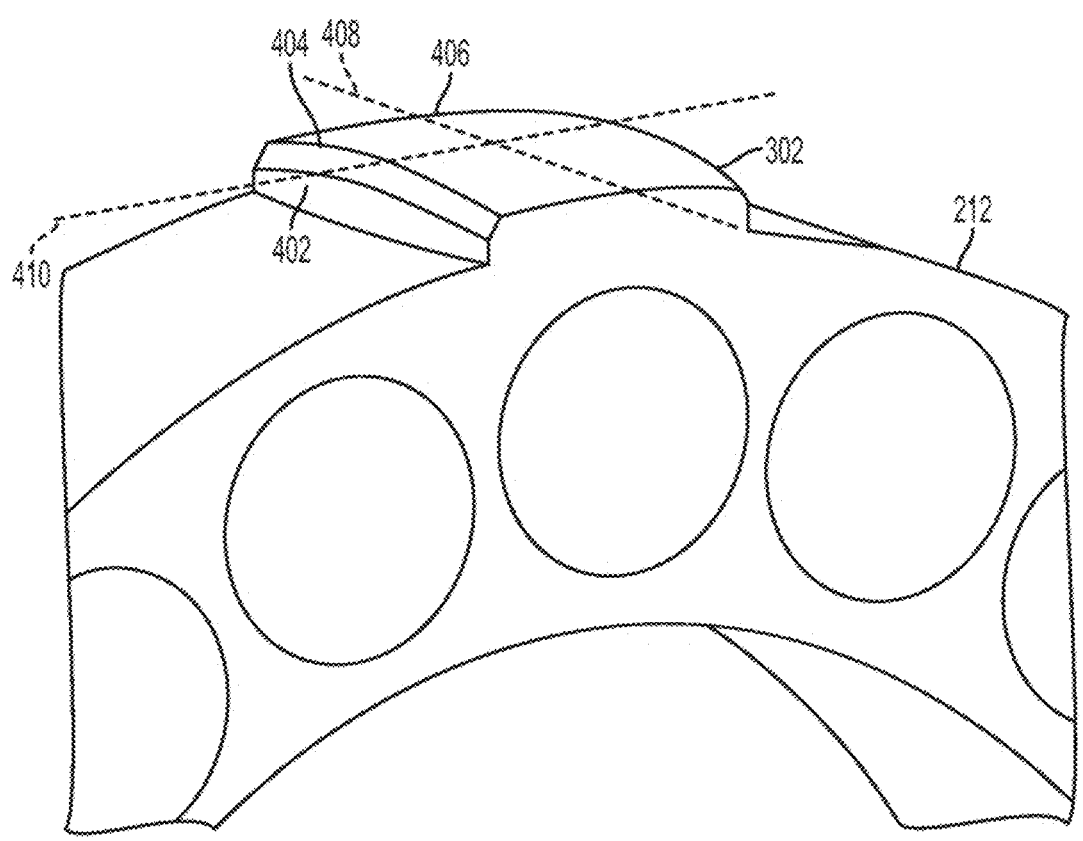
FIG. 4 is a magnified, perspective view of an example of a stationary thrust bearing for use in an assembly for aligning thrust bearings downhole according to some aspects.

The interlocking component 302 can include multiple surfaces 402-406, as shown in FIG. 4. For example, the interlocking component 302 can include side surfaces 402 extending radially outward from a circumference of the stationary thrust bearing 212. Rounded surfaces 404 or chamfers can connect the side surfaces 402 to a top surface 406. The top surface 406 can include a rounded shape. The top surface 406 can be rounded in two dimensions (e.g., rounded about axes 408 and 410).

Figure 5:
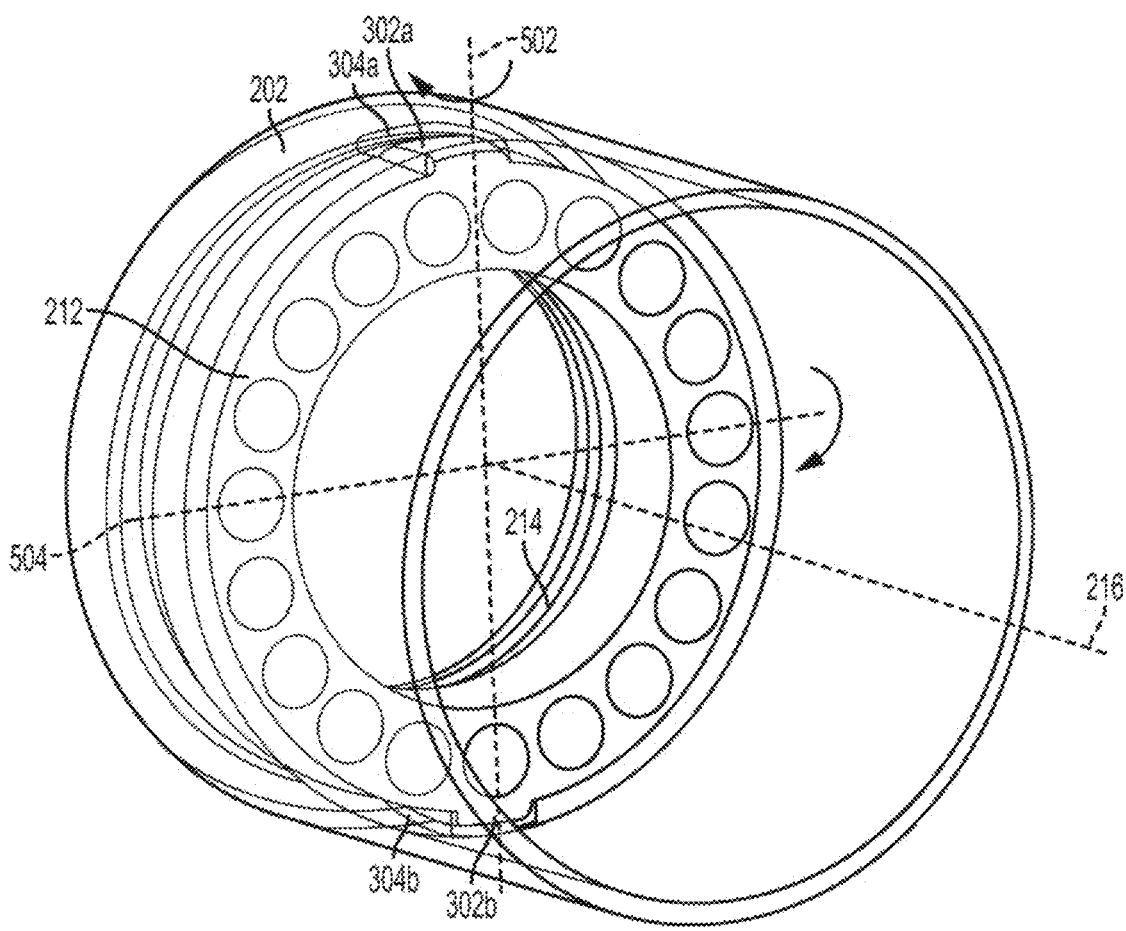
FIG. 5 is an isometric view of an example of an assembly for aligning thrust bearings downhole according to some aspects.

In some examples, the rounded shape of the top surface 406 can allow the stationary thrust bearing 212 to rotate about one or more axes. For example, as shown in FIG. 5, the stationary thrust bearing 212 can include multiple interlocking components 302*a-b* positioned in respective recessed areas 304*a-b* of the thrust bearing sleeve. The rounded top surfaces of the interlocking components 302*a-b* can allow the stationary thrust bearing 212 to rotate about axis 502, axis 504, or both. The rotation of the stationary thrust bearing 212 about axes 502, 504 can allow an interface surface of the stationary thrust bearing 212 to stay aligned with an interface surface of an adjacent rotating thrust bearing. For example, should the rotating thrust bearing reposition during drilling operations, the stationary thrust bearing 212 can rotate about axis 502, axis 504, or both to realign the stationary thrust bearing 212 such that the face of the stationary thrust bearing 212 is substantially parallel to the face of the rotating thrust bearing. The flexible member 214 can apply a force to counteract rotation about the axis 502, axis 504, or both. The force can return the stationary thrust bearing 212 to a default, unrotated position (e.g., as shown in FIG. 5), or otherwise allow the stationary thrust bearing 212 to remain substantially aligned with the rotating thrust bearing.

In some examples, the interlocking components 302*a-b* mating with respective recessed areas 304*a-b* can prevent the stationary thrust bearing 212 from rotating about the central axis 216. This can help ensure that the stationary thrust bearing 212 remains aligned with the rotating thrust bearing.

Any number of recessed areas 304*a-b* and corresponding interlocking components 302*a-b* can be used. The number of recessed areas 304*a-b* and corresponding interlocking components 302*a-b* can be increased to combat increased rotational torque (e.g., about central axis 216) applied to the stationary thrust bearing 212. In some examples, the interlocking component 302*a-b* can be part of the stationary thrust bearing 212 (e.g., as shown in FIG. 5). In other examples, the interlocking component 302*a-b* can be separate from and coupled to the stationary thrust bearing 212.

Figure 6:
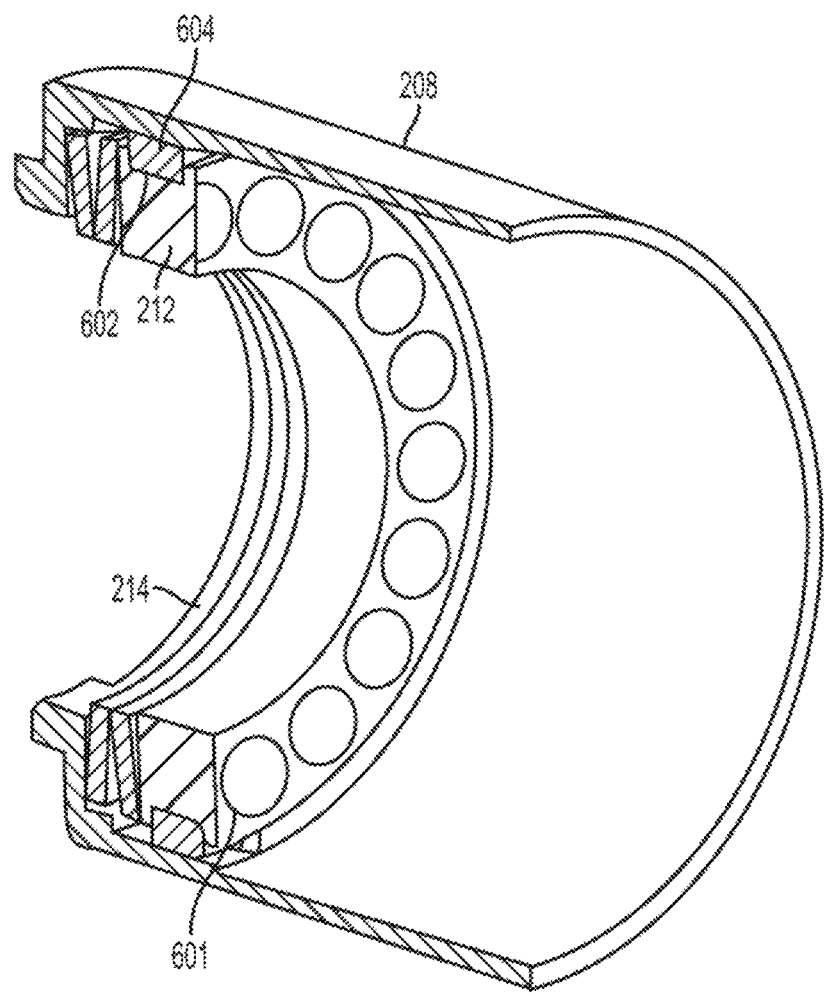
FIG. 6 is a cross-sectional, isometric view of another example of an assembly for aligning thrust bearings downhole according to some aspects.
Figure 7:
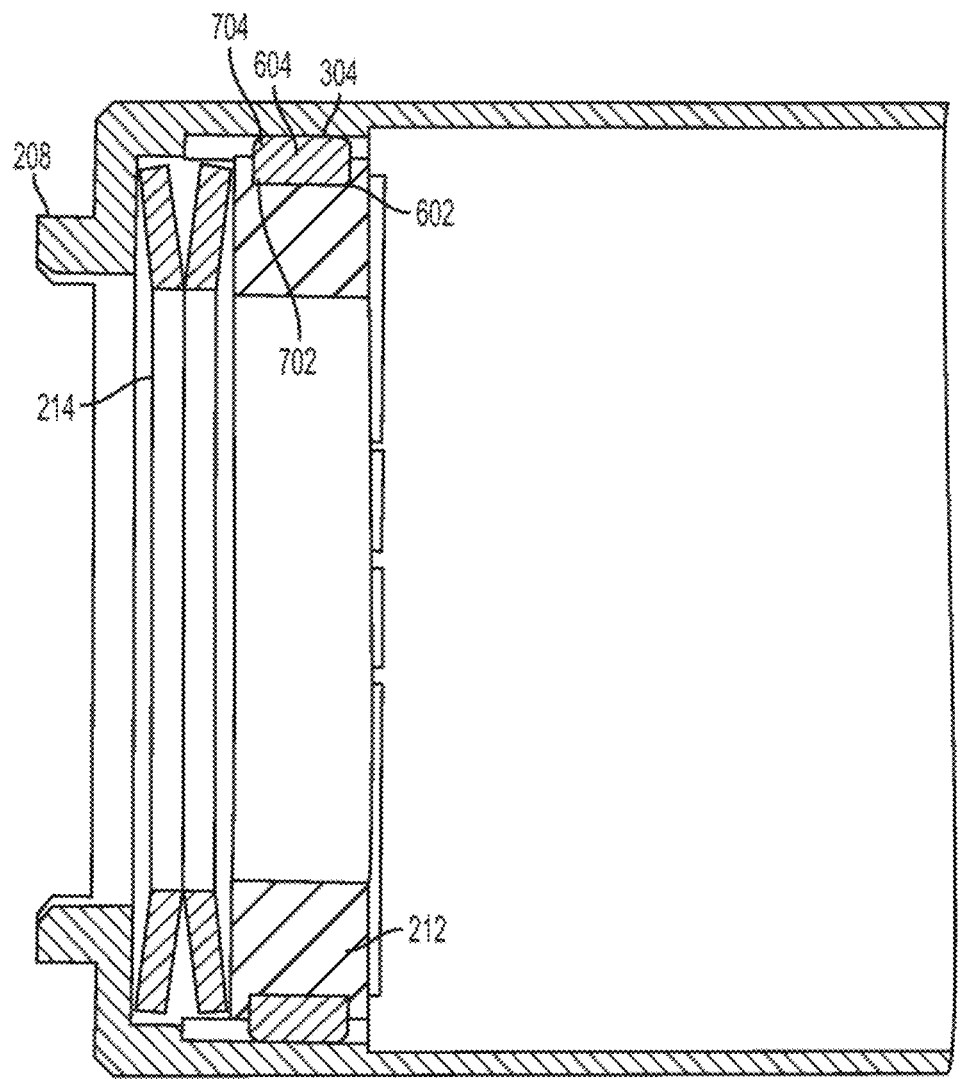
FIG. 7 is a cross-sectional side view of the example shown in FIG. 6 according to some aspects.
Figure 8:
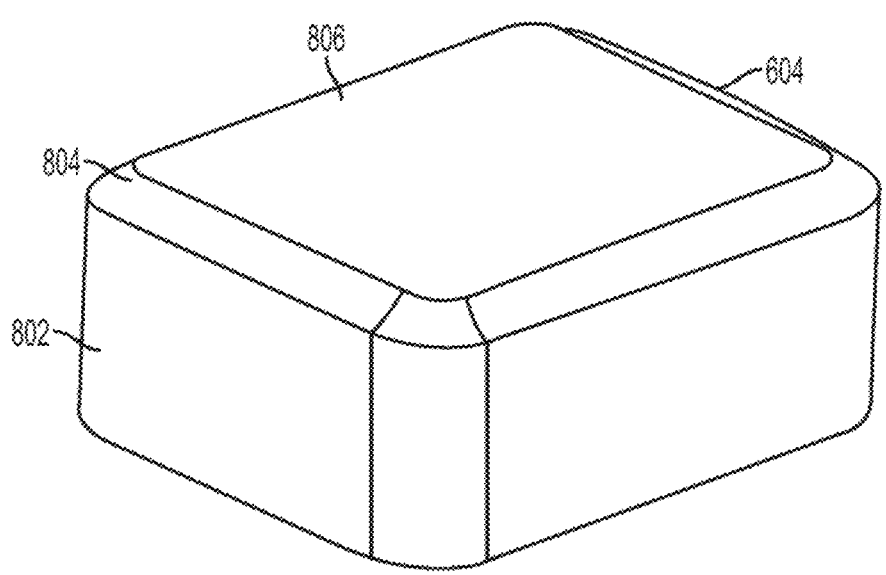
FIG. 8 is a perspective view of an interlocking component for use with the assembly shown in FIG. 6 according to some aspects.

For example, FIGS. 6-8 depict an example of another assembly for aligning thrust bearings downhole according to some aspects. In this example, the stationary thrust bearing 212 includes multiple separation components 601 (e.g., balls or PDC inserts) for separating the stationary thrust bearing 212 from an adjacent rotating thrust bearing. The stationary thrust bearing 212 also includes a recessed area 602. The recessed area 602 can be for receiving a separate interlocking component 604. For example, the recessed area 602 can include a rectangular shape that is sized for receiving the interlocking component 604. One end 702 of the interlocking component 604 can be positioned in the recessed area 602 of the stationary thrust bearing 212 and the other end 704 of the interlocking component 604 can be positioned in a recessed area 304 of the thrust bearing sleeve 208. This can interlock the stationary thrust bearing 212 with the thrust bearing sleeve 208 to prevent the stationary thrust bearing 212 from rotating about a central axis (e.g., central axis 216 of FIG. 5).

In some examples, the separate interlocking component 604 can include the shape depicted in FIG. 8. For example, the interlocking component 604 can include side surfaces 802 coupled to a top surface 806 via rounded surfaces 804 or chamfers. The top surface 806 can include a rounded shape. This can allow the stationary thrust bearing 212 to rotate in two degrees of freedom (e.g., about axes 502, 504 shown in FIG. 5) when the interlocking component 604 is positioned within the recessed area 304 of the thrust bearing sleeve 208.

Figure 9:
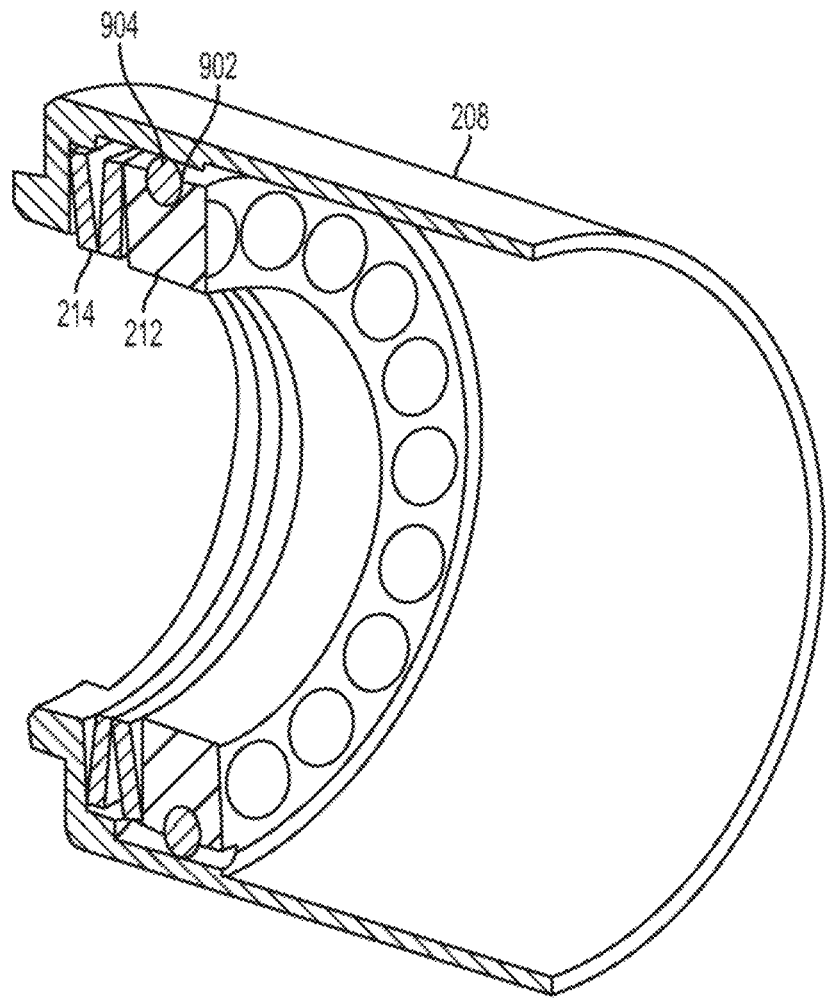
FIG. 9 is a cross-sectional isometric view of another example of an assembly for aligning thrust bearings downhole according to some aspects.
Figure 10:
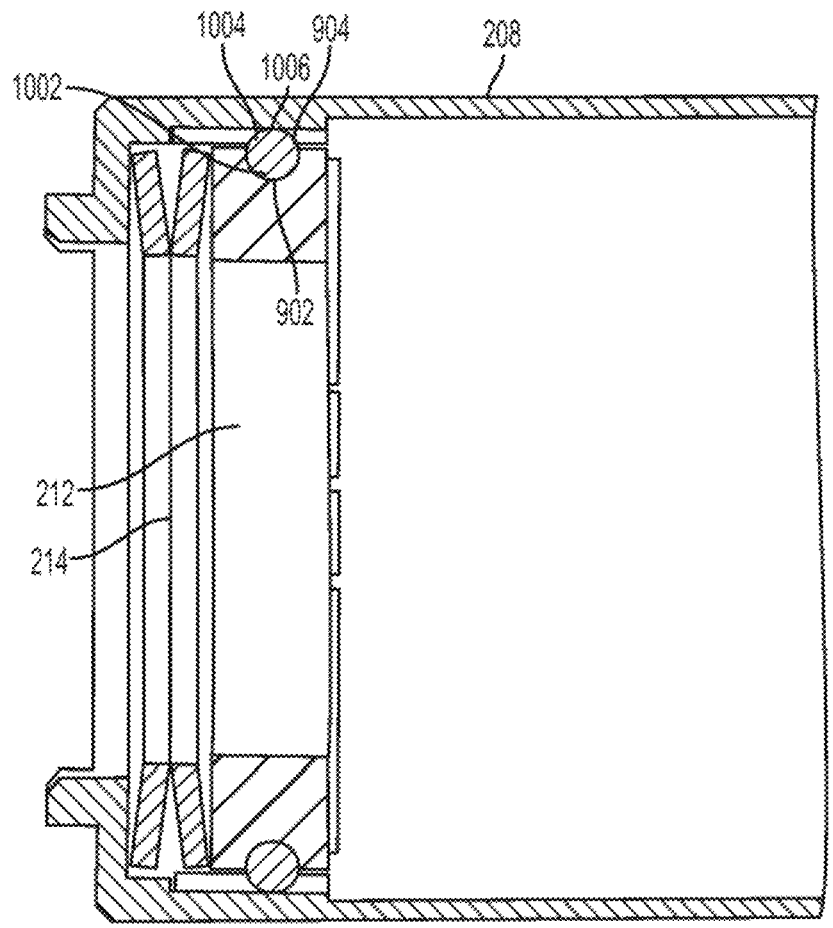
FIG. 10 is a cross-sectional side view of the example shown in FIG. 9 according to some aspects.
Figure 11:
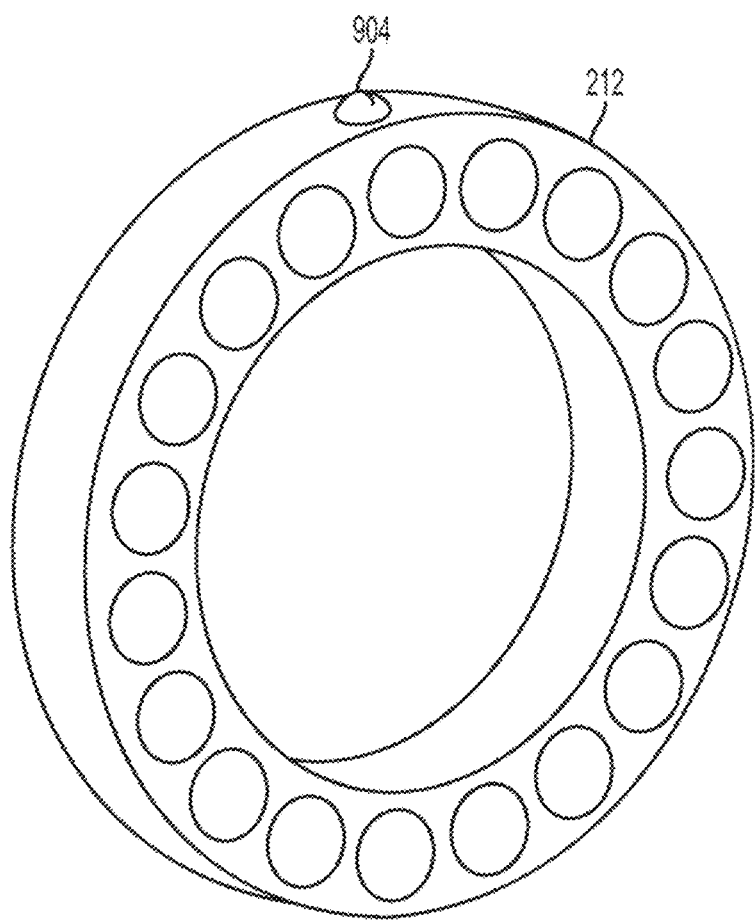
FIG. 11 is a perspective view of spherical interlocking component coupled to a stationary thrust bearing for use with the assembly shown in FIG. 9 according to some aspects.

FIGS. 9-11 depict an example of another assembly for aligning thrust bearings downhole according to some aspects. In this example, the stationary thrust bearing 212 includes a recessed area 902. The recessed area 902 can be for receiving a separate interlocking component 904. For example, recessed areas 902 and 1006 can include a rectangular shape or a slot that is sized for receiving the interlocking component 904. One end 1002 of the interlocking component 904 can be positioned in the recessed area 902 of the stationary thrust bearing 212 (e.g., as shown in FIG. 10) and the other end 1004 of the interlocking component 904 can be positioned in a recessed area 1006 of the thrust bearing sleeve 208. This can interlock the stationary thrust bearing 212 with the thrust bearing sleeve 208 to prevent the stationary thrust bearing 212 from rotating about a central axis (e.g., central axis 216 of FIG. 5).

In some examples, the interlocking component 904 can include a ball shape or a spherical shape. This can allow the stationary thrust bearing 212 to rotate in two degrees of freedom (e.g., about axes 502, 504 shown in FIG. 5) when the interlocking component 904 is positioned within the recessed area 1006 of the thrust bearing sleeve 208.

Other configurations of assemblies for aligning thrust bearings downhole are possible. For example, the interlocking component 904 can include a dowel or rod. The dowel or rod can include a cylindrical shape. In one example, the stationary thrust bearing 212 and the thrust bearing sleeve 208 can each include a cylindrically shaped recessed area 902, 1006 for receiving either end of the interlocking component 904. The stationary thrust bearing 212 can rotate in one degree of freedom. For example, the stationary thrust bearing 212 can rotate about axis 502 of FIG. 5, but not axis 504. This can allow the stationary thrust bearing 212 to stay substantially aligned with an adjacent rotating thrust bearing.

In some aspects, thrust bearing alignment is provided according to one or more of the following examples:

EXAMPLE #1

An assembly for use in a wellbore can include a drill string. The drill string can include an outer housing. The assembly can also include a thrust bearing sleeve positioned within the outer housing of the drill string. The assembly can also include a stationary thrust bearing positioned within the thrust bearing sleeve and coaxially around a mandrel extending through a longitudinal length of the thrust bearing sleeve. The assembly can further include an interlocking component including a first end coupled to the stationary thrust bearing and a second end positioned in a recessed portion of a housing of the drill string for preventing the stationary thrust bearing from rotating about a central axis of the mandrel, and for allowing the stationary thrust bearing to rotate about one or more axes perpendicular to the central axis. The assembly can also include a flexible member positioned within the thrust bearing sleeve and adjacent to the stationary thrust bearing for opposing a rotational force about the one or more axes applied to the stationary thrust bearing by another thrust bearing.

EXAMPLE #2

The assembly of Example #1 may feature the interlocking component including a rounded top surface coupled to side surfaces via rounded edges for allowing the stationary thrust bearing to rotate about the one or more axes perpendicular to the central axis.

EXAMPLE #3

The assembly of any of Examples #1-2 may feature the stationary thrust bearing including another recessed portion for receiving the first end of the interlocking component.

EXAMPLE #4

The assembly of any of Examples #1-3 may feature the interlocking component including a spherical shape and the recessed portion of the housing including a rectangular shape.

EXAMPLE #5

The assembly of any of Examples #1-4 may feature the other thrust bearing being positioned adjacent to the stationary thrust bearing and coaxially around the mandrel for rotating about the central axis and distributing a thrust load through the drill string.

EXAMPLE #6

The assembly of any of Examples #1-5 may feature one or more additional interlocking components coupled to the stationary thrust bearing. An end of each additional interlocking component can be positioned within a respective additional recessed portion of the housing.

EXAMPLE #7

A bottom hole assembly for use in a wellbore can include a stationary thrust bearing positioned within an outer housing of the bottom hole assembly and coaxially around a mandrel extending through a longitudinal length of the bottom hole assembly. The bottom hole assembly can also include a thrust bearing positioned adjacent to the stationary thrust bearing and coaxially around the mandrel, the thrust bearing coupled to and rotatable with the mandrel. The bottom hole assembly can further include an interlocking component including a first end coupled to the stationary thrust bearing and a second end positioned in a recessed portion of a housing of the bottom hole assembly for preventing the stationary thrust bearing from rotating about a central axis of the mandrel, and for allowing the stationary thrust bearing to rotate about one or more axes perpendicular to the central axis to align a face of the stationary thrust bearing with another face of the thrust bearing.

EXAMPLE #8

The bottom hole assembly of Example #7 may feature the interlocking component including a rounded top surface coupled to side surfaces via rounded edges for allowing the stationary thrust bearing to rotate about the one or more axes perpendicular to the central axis.

EXAMPLE #9

The bottom hole assembly of any of Examples #7-8 may feature the stationary thrust bearing including another recessed portion for receiving the first end of the interlocking component.

EXAMPLE #10

The bottom hole assembly of any of Examples #7-9 may feature the interlocking component including a spherical shape and the recessed portion of the housing including a rectangular shape.

EXAMPLE #11

The bottom hole assembly of any of Examples #7-10 may feature the stationary thrust bearing and the thrust bearing being configured for distributing a thrust load through the bottom hole assembly.

EXAMPLE #12

The bottom hole assembly of any of Examples #7-11 may feature one or more additional interlocking components coupled to the stationary thrust bearing. An end of each additional interlocking component can be positioned within a respective additional recessed portion of the housing.

EXAMPLE #13

The bottom hole assembly of any of Examples #7-12 may feature a flexible member positioned within the housing and adjacent to the stationary thrust bearing for opposing a rotational force applied to the stationary thrust bearing by the thrust bearing. The flexible member can include at least one of a Bellville spring, wave spring, coil spring, or an elastomer.

EXAMPLE #14

A stationary thrust bearing for use in a wellbore can include an interlocking component including a first end coupled to the stationary thrust bearing and a second end positionable in a recessed portion of a housing of a bottom hole assembly for preventing the stationary thrust bearing from rotating about a central axis of the stationary thrust bearing, and for allowing the stationary thrust bearing to rotate about one or more axes perpendicular to the central axis to align a face of the stationary thrust bearing with another face of another thrust bearing.

EXAMPLE #15

The stationary thrust bearing of Example #14 may feature a thrust bearing sleeve. The stationary thrust bearing may also feature a mandrel extending through a longitudinal length of the thrust bearing sleeve. The stationary thrust bearing can be positionable coaxially around the mandrel. The stationary thrust bearing may further feature the other thrust bearing. The other thrust bearing can be coupled to and positioned coaxially around the mandrel for rotating with the mandrel.

EXAMPLE #16

The stationary thrust bearing of Example #15 may feature the stationary thrust bearing being positioned adjacent to a flexible member positioned within the thrust bearing sleeve for opposing a rotational force about the one or more axes applied to the stationary thrust bearing by the other thrust bearing. The flexible member can include at least one of a Bellville spring, wave spring, coil spring, or an elastomer.

EXAMPLE #17

The stationary thrust bearing of any of Examples #14-16 may feature the interlocking component including a rounded top surface coupled to a side surface via a rounded edge for allowing the stationary thrust bearing to rotate about the one or more axes perpendicular to the central axis.

EXAMPLE #18

The stationary thrust bearing of any of Examples #14-17 may feature the stationary thrust bearing including another recessed portion for receiving the first end of the interlocking component. The first end of the interlocking component can be removably coupled to the stationary thrust bearing.

EXAMPLE #19

The stationary thrust bearing of any of Examples #14-18 may feature the interlocking component including a spherical shape and the other recessed portion of the stationary thrust bearing including a rectangular shape.

EXAMPLE #20

The stationary thrust bearing of any of Examples #14-19 may feature one or more additional interlocking components coupled to the stationary thrust bearing. An end of each additional interlocking component can be positionable within a respective additional recessed portion of the housing.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An assembly for use in a wellbore, the assembly comprising:
    a drill string comprising an outer housing;
    a thrust bearing sleeve positioned within the outer housing of the drill string;
    a stationary thrust bearing positioned within the thrust bearing sleeve and coaxially around a mandrel extending through a longitudinal length of the thrust bearing sleeve;
    an interlocking component including a first end coupled to the stationary thrust bearing and a second end positioned in a recessed portion of the thrust bearing sleeve for (i) preventing the stationary thrust bearing from rotating about a central axis of the mandrel and (ii) allowing the stationary thrust bearing to rotate about one or more axes perpendicular to the central axis, wherein the interlocking component has side surfaces extending radially outwardly from the stationary thrust bearing in a direction that is perpendicular to the central axis, and wherein the interlocking component has a rounded top surface coupling the side surfaces together; and
    a flexible member positioned within the thrust bearing sleeve and adjacent to the stationary thrust bearing for opposing a rotational force about the one or more axes applied to the stationary thrust bearing by another thrust bearing.

2. The assembly of claim 1, wherein the rounded top surface is coupled to the side surfaces via rounded edges.

3. The assembly of claim 1, wherein the stationary thrust bearing includes another recessed portion for receiving the first end of the interlocking component.

4. The assembly of claim 1, wherein the interlocking component comprises a spherical shape and the recessed portion of the thrust bearing sleeve comprises a rectangular shape.

5. The assembly of claim 1, further comprising the other thrust bearing positioned adjacent to the stationary thrust bearing and coaxially around the mandrel for rotating about the central axis and distributing a thrust load through the drill string.

6. The assembly of claim 1, further comprising one or more additional interlocking components coupled to the stationary thrust bearing, wherein an end of each additional interlocking component is positioned within a respective additional recessed portion of the thrust bearing sleeve.

7. The assembly of claim 1, wherein the rounded top surface extends between the side surfaces in a direction that is parallel to the central axis.

8. The assembly of claim 1, wherein the rounded top surface is substantially parallel to the central axis.

9. A bottom hole assembly for use in a wellbore, the bottom hole assembly comprising:
    a stationary thrust bearing positioned within the bottom hole assembly and coaxially around a mandrel extending through a longitudinal length of the bottom hole assembly;
    a thrust bearing positioned adjacent to the stationary thrust bearing and coaxially around the mandrel, the thrust bearing coupled to and rotatable with the mandrel; and
    an interlocking component including a first end coupled to the stationary thrust bearing and a second end positioned in a recessed portion of a housing of the bottom hole assembly for (i) preventing the stationary thrust bearing from rotating about a central axis of the mandrel and (ii) allowing the stationary thrust bearing to rotate about one or more axes perpendicular to the central axis to align a face of the stationary thrust bearing with another face of the thrust bearing, wherein the interlocking component has side surfaces extending radially outwardly from the stationary thrust bearing in a direction that is perpendicular to the central axis, and wherein the interlocking component has a rounded top surface coupling the side surfaces together.

10. The bottom hole assembly of claim 9, wherein the rounded top surface is coupled to the side surfaces via rounded edges.

11. The bottom hole assembly of claim 9, wherein the stationary thrust bearing includes another recessed portion for receiving the first end of the interlocking component.

12. The bottom hole assembly of claim 9, wherein the interlocking component comprises a spherical shape and the recessed portion of the housing comprises a rectangular shape.

13. The bottom hole assembly of claim 9, further comprising one or more additional interlocking components coupled to the stationary thrust bearing, wherein an end of each additional interlocking component is positioned within a respective additional recessed portion of the housing.

14. The bottom hole assembly of claim 9, further comprising a flexible member positioned within the housing and adjacent to the stationary thrust bearing for opposing a rotational force applied to the stationary thrust bearing by the thrust bearing, the flexible member comprising at least one of a Bellville spring, wave spring, coil spring, or an elastomer.

15. A stationary thrust bearing for use in a wellbore, the stationary thrust bearing comprising:
an interlocking component including a first end coupled to the stationary thrust bearing and a second end positionable in a recessed portion of a housing of a bottom hole assembly for (i) preventing the stationary thrust bearing from rotating about a central axis of the stationary thrust bearing and (ii) allowing the stationary thrust bearing to rotate about one or more axes perpendicular to the central axis to align a face of the stationary thrust bearing with another face of another thrust bearing, wherein the interlocking component is a sphere.

16. The stationary thrust bearing of claim 15, wherein the stationary thrust bearing is positioned in the bottom hole assembly, the bottom hole assembly comprising:
a thrust bearing sleeve;
a mandrel extending through a longitudinal length of the thrust bearing sleeve, wherein the stationary thrust bearing is positionable coaxially around the mandrel; and
the other thrust bearing, wherein the other thrust bearing is coupled to and positioned coaxially around the mandrel for rotating with the mandrel.

17. The stationary thrust bearing of claim 16, wherein the stationary thrust bearing is positioned adjacent to a flexible member positioned within the thrust bearing sleeve for opposing a rotational force about the one or more axes applied to the stationary thrust bearing by the other thrust bearing, the flexible member comprising at least one of a Bellville spring, wave spring, coil spring, or an elastomer.

18. The stationary thrust bearing of claim 15, wherein the stationary thrust bearing includes another recessed portion for receiving the first end of the interlocking component, and wherein the first end of the interlocking component is removably coupled to the stationary thrust bearing.

19. The stationary thrust bearing of claim 18, wherein the other recessed portion of the stationary thrust bearing comprises a rectangular shape.

20. The stationary thrust bearing of claim 15, further comprising one or more additional interlocking components coupled to the stationary thrust bearing, wherein an end of each additional interlocking component is positionable within a respective additional recessed portion of the housing.

* * * * *